US010602681B2

(12) United States Patent
Lundgren

(10) Patent No.: US 10,602,681 B2
(45) Date of Patent: Mar. 31, 2020

(54) FEED WHEEL ARRANGEMENT, TIMBER WORKING HEAD, CRANE, AND TIMBER WORKING MACHINE

(71) Applicant: Komatsu Forest AB, Umeå (SE)

(72) Inventor: Karl Lundgren, Umeå (SE)

(73) Assignee: KOMATSU FOREST AB, Umeå (SE)

( * ) Notice: Subject to any disclaimer, the term of this patent is extended or adjusted under 35 U.S.C. 154(b) by 79 days.

(21) Appl. No.: 14/785,228

(22) PCT Filed: Apr. 18, 2013

(86) PCT No.: PCT/SE2013/050422
§ 371 (c)(1),
(2) Date: Oct. 16, 2015

(87) PCT Pub. No.: WO2014/171865
PCT Pub. Date: Oct. 23, 2014

(65) Prior Publication Data
US 2016/0143230 A1 May 26, 2016

(51) Int. Cl.
A01G 23/083 (2006.01)
A01G 23/095 (2006.01)
(Continued)

(52) U.S. Cl.
CPC .......... A01G 23/083 (2013.01); A01G 23/08 (2013.01); A01G 23/095 (2013.01); B27B 25/02 (2013.01)

(58) Field of Classification Search
CPC .... A01G 23/08; A01G 23/083; A01G 23/085; A01G 23/093; A01G 23/095;
(Continued)

(56) References Cited

U.S. PATENT DOCUMENTS 3,315,714 A * 4/1967 Meier .................... A01G 23/08
144/24.13
3,454,058 A * 7/1969 Fritz ...................... A01G 23/08
144/2.1
(Continued)

FOREIGN PATENT DOCUMENTS

| CA | 2279032 C | 8/2000 |
| WO | 2000/13485 A1 | 3/2000 |
| WO | 2008/143644 A1 | 11/2008 |

OTHER PUBLICATIONS

International Preliminary Report on Patentability received for PCT Patent Application No. PCT/SE2013/050422, completed on Jun. 29, 2015, 4 pages.
(Continued)

Primary Examiner — Shelley M Self
Assistant Examiner — Smith Oberto Bapthelus
(74) Attorney, Agent, or Firm — Morrison & Foerster LLP

(57) ABSTRACT

This invention concerns a feed wheel arrangement intended to be used in a timber working head for at least one of felling, trimming, bark-peeling and cutting of a tree or tree trunk, comprising a frame to which feed wheels and grip fittings are mounted either fixed or in a manner that allows them to be removed. The feed wheel arrangement comprises a feed wheel with a power transfer arrangement lowered centrally in a jacket of the feed wheel, a motor arranged at a distance from the feed wheel, and a power transfer arrangement for the transfer of rotational force from the motor to the feed wheel, for the feed of the tree or trunk through the timber working head. The invention concerns also a timber working head, a crane and a timber working machine.

12 Claims, 7 Drawing Sheets

(51) Int. Cl.
*B27B 25/02* (2006.01)
*A01G 23/08* (2006.01)

(58) Field of Classification Search
CPC .... A01G 23/00; A01G 23/081; A01G 23/087; A01G 23/091; A01G 23/0955; A01G 23/097; B25L 1/00; B25L 1/005; B27B 25/00; B27B 25/02; B27B 29/00; B27B 29/04; B27B 29/08; B27B 31/00; B27B 31/003; B27B 31/04; B27B 31/08
USPC ......... 144/4.1, 242.1, 246.1, 250.13, 250.21, 144/250.22
See application file for complete search history.

(56) References Cited

U.S. PATENT DOCUMENTS

| | | | | |
|---|---|---|---|---|
| 3,542,099 A * | 11/1970 | Gibson | ................ | A01G 23/091 144/338 |
| 3,693,680 A * | 9/1972 | Moser | ................ | A01G 23/083 144/4.1 |
| 3,768,529 A * | 10/1973 | McColl | ................ | A01G 23/083 144/338 |
| 3,797,540 A | 3/1974 | Propst | | |
| 3,970,124 A * | 7/1976 | Hamilton | ................ | A01G 23/08 101/4 |
| 4,078,590 A | 3/1978 | Smith | | |
| 4,098,311 A | 7/1978 | Larsson | | |
| 4,753,338 A * | 6/1988 | Ketonen | ................ | A01G 23/097 144/245.2 |
| 4,834,156 A * | 5/1989 | Forslund | ................ | B27L 1/045 144/24.13 |
| 5,735,325 A * | 4/1998 | Timperi | ................ | A01G 23/097 144/24.13 |
| 5,957,177 A * | 9/1999 | Smith | ................ | A01G 23/083 144/208.1 |
| 6,202,719 B1 * | 3/2001 | Ketonen | ................ | A01G 23/08 144/24.13 |
| 6,375,243 B1 | 4/2002 | Bradley et al. | | |
| 7,938,154 B2 * | 5/2011 | Quirke | ................ | A01G 23/093 144/34.1 |
| 7,954,524 B2 * | 6/2011 | Voermans | ............ | A01G 23/095 144/24.13 |
| 8,650,846 B2 * | 2/2014 | Wuebbels | ............ | A01D 43/082 56/94 |
| 9,232,701 B1 * | 1/2016 | Peterson | ............. | A01G 23/083 |
| 2006/0278305 A1 | 12/2006 | Barlow et al. | | |
| 2008/0178569 A1 * | 7/2008 | Hamel | ................ | E02F 3/3681 56/15.2 |
| 2010/0313997 A1 | 12/2010 | Quirke et al. | | |

OTHER PUBLICATIONS

International Search Report and Written Opinion received for PCT Patent Application No. PCT/SE2013/050422, dated Jan. 28, 2014, 13 pages.
Extended European Search Report (includes Supplementary European Search Report and Search Opinion) received for European Patent Application No. 13882152.5, dated Oct. 19, 2016, 8 pages.
Office Action received for Australian Patent Application No. 2013386894, dated Feb. 21, 2017, 3 pages.
Office Action received for European Patent Application No. 13882152.5, dated Jan. 19, 2018, 7 pages.
Office Action received for European Patent Application No. 13882152.5, dated Nov. 13, 2018, 4 pages.

\* cited by examiner

FEED WHEEL ARRANGEMENT, TIMBER WORKING HEAD, CRANE, AND TIMBER WORKING MACHINE

CROSS REFERENCE TO RELATED APPLICATION

This application is a U.S. National Stage patent application of PCT/SE2013/050422, filed on Apr. 18, 2013, the entire contents of which are incorporated herein by reference.

FIELD OF THE INVENTION

The present invention concerns a feed wheel arrangement intended to be used in a timber working head for at least one of felling, trimming, bark-peeling and cutting of a tree or tree trunk where the timber working head comprises a frame on which feed wheels and grip fittings are mounted either fixed, or in a manner that allows them to be removed. The invention concerns also a timber working head, a crane and a timber working machine comprising such a feed wheel arrangement.

BACKGROUND OF THE INVENTION

The present invention relates to what is known as a "grip harvester", to be more precise, a timber working head for at least one of trimming, cutting, bark-peeling and preferably also felling, and of the type that is arranged to be suspended with its frame in a crane, which timber working head comprises grippers mounted to pivot for the gripping of a tree, trimming means preferably connected to the grippers, a chain saw for the felling and cutting of a tree and driven feed wheels for feed of the felled tree through the timber working head for trimming and cutting.

Harvesters of this type are previously known and have as a rule their feed wheels so arranged relative to the grippers that they accompany the motion of the grippers to and from the gripping position. It has proved to be the case with this arrangement that the feed wheels when gripping a tree trunk with a small diameter do not make contact with the tree in a correct manner, but instead more or less press the tree trunk against the timber working head. This leads to the feed wheels damaging the tree trunk through the feed wheels sliding against the tree trunk, which gives a poorer quality for the tree, and in addition wear of the edge of the feed wheels takes place, which shortens the lifetime of the feed wheels.

SUMMARY OF THE INVENTION

The purpose of the present invention, therefore, is to achieve a feed wheel arrangement that makes possible a timber working head of the type described above that does not suffer from the said disadvantages, but is so arranged that it gives, independently of the diameter of the tree, satisfactory contact with the tree trunk such that the feed through the timber working head takes place with limited damage to the tree trunk and reduced wear of the feed wheels. In addition to the improvements that are described above that are achieved with the present invention, the resulting timber working head has small external dimensions, and the possibility of simpler repair and maintenance is achieved.

This is achieved through a feed wheel arrangement, a timber working head, a crane and a timber working machine according to the present invention that demonstrate the characteristics described below.

BRIEF DESCRIPTION OF THE DRAWINGS

This invention will be described in more detail below with reference to the attached drawings, of which.

DETAILED DESCRIPTION OF THE INVENTION

Figure 1:
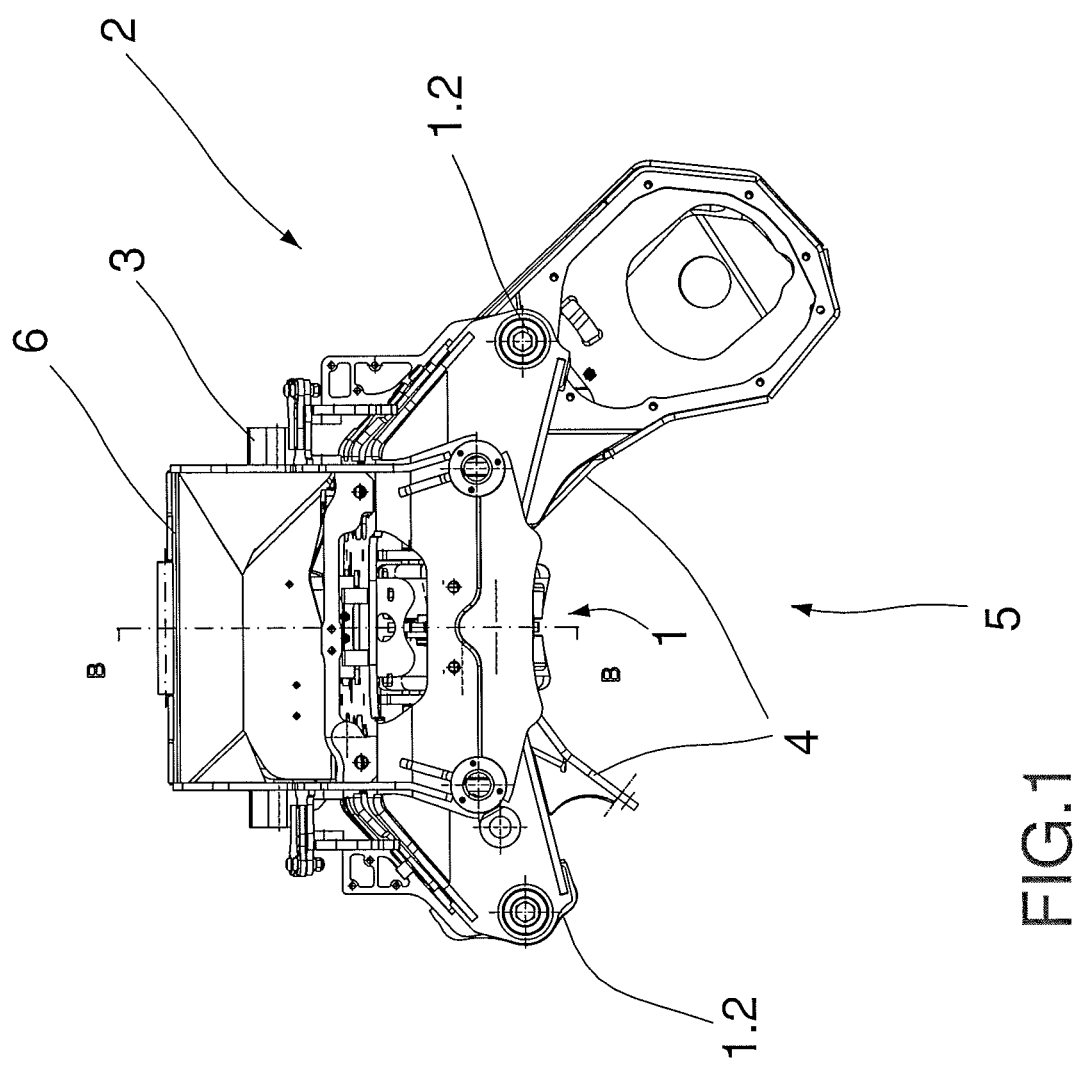
FIG. 1 shows a timber working head seen from above.
Figure 4:
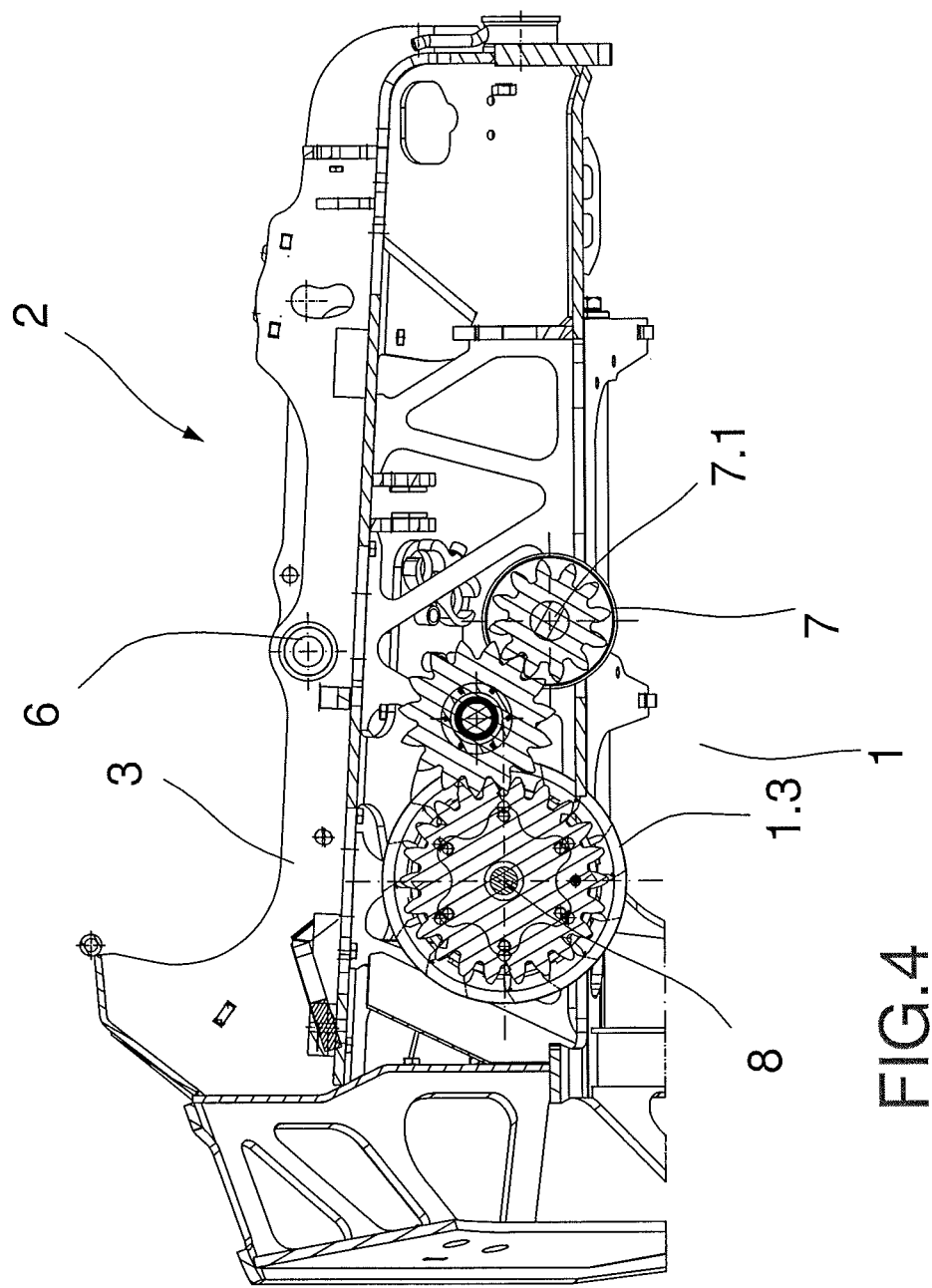
FIG. 4 shows a sectional view taken from the timber working head that is shown in FIG. 1.
Figure 5:
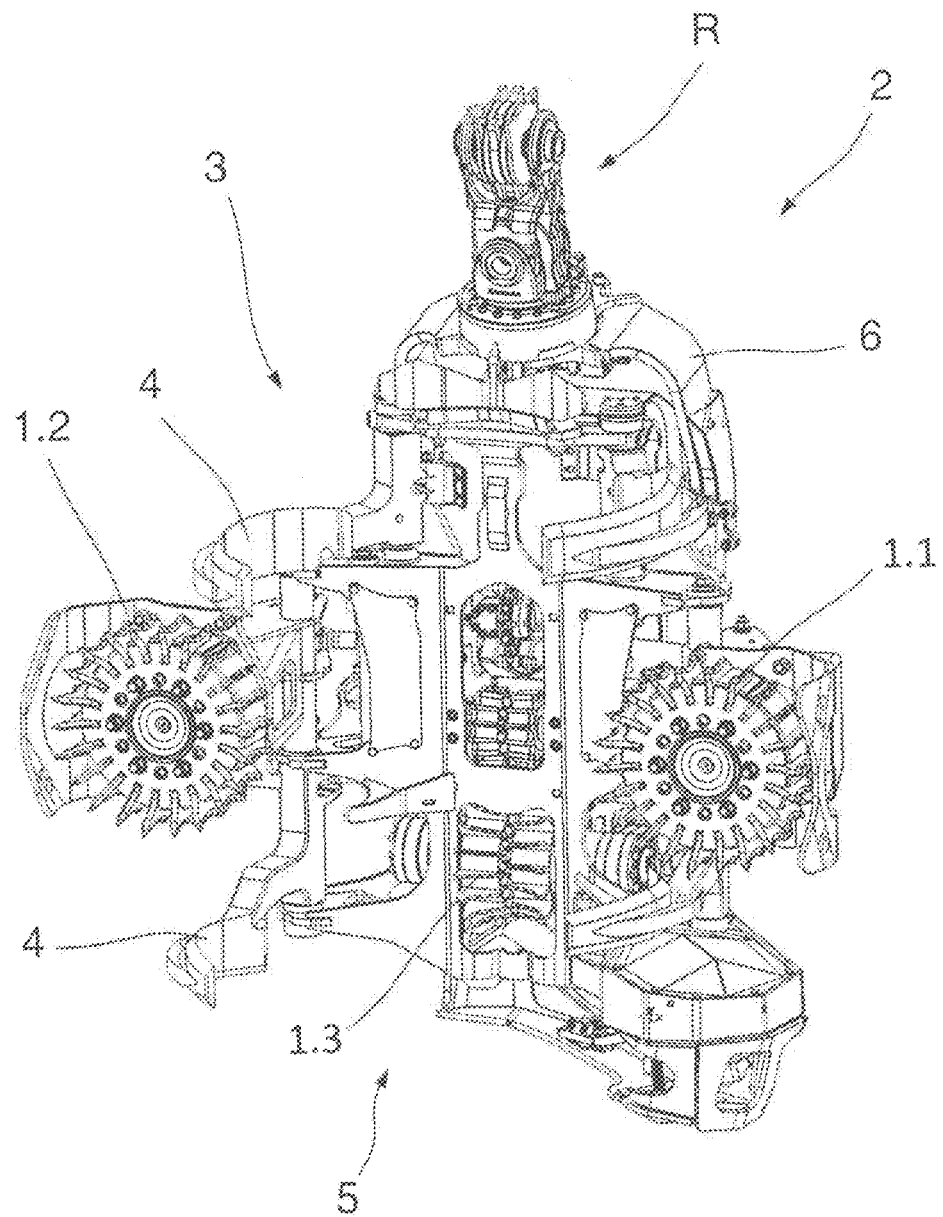
FIG. 5 shows a view of a timber working head seen from the front.
Figure 6:
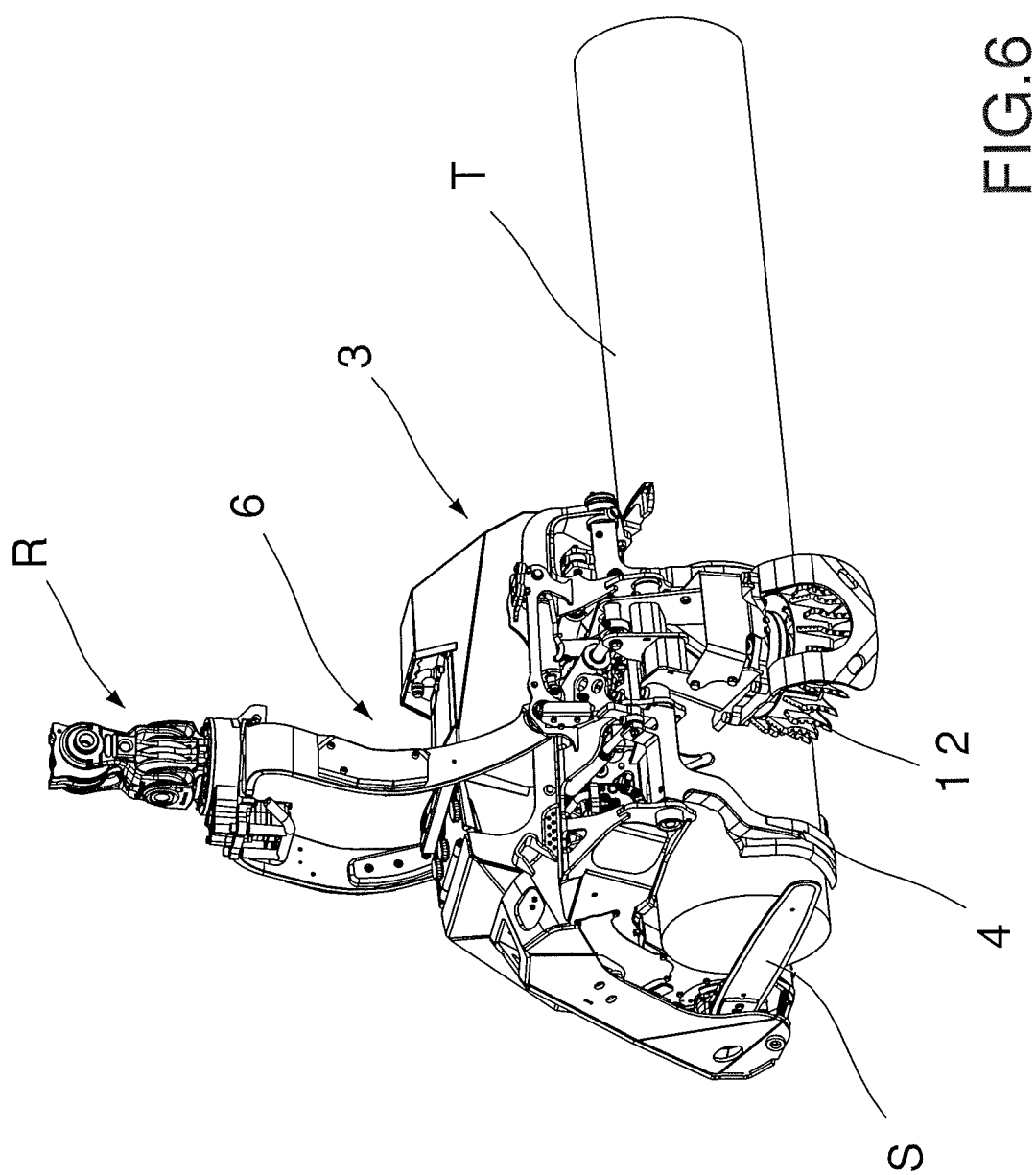
FIG. 6 shows a timber working head in which a tree trunk has been placed.
Figure 7:
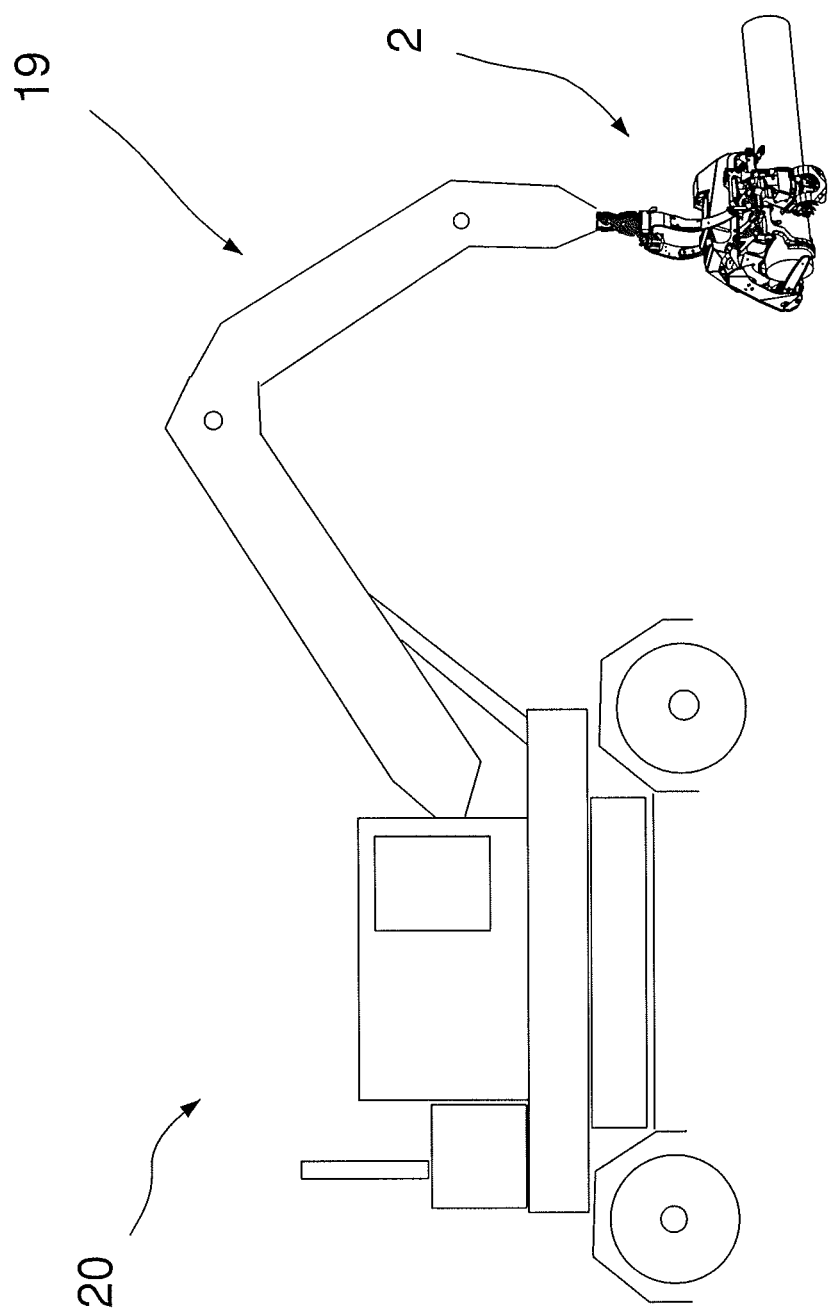
FIG. 7 shows a timber working head mounted at a crane on a timber working machine.

A feed wheel arrangement 1 according to the invention is intended to be used in a timber working head 2 that is intended for at least one of felling, trimming, bark-peeling and cutting of a tree or tree trunk, as is shown in FIGS. 1 and 4. The timber working head 2 shown in FIGS. 1 and 5 comprises a frame 3 to which feed wheels 1.1-1.3 and grip fittings 4 are mounted either fixed or in a manner that allows them to be removed. The frame 3 demonstrates in known manner grip fittings 4 intended to grip the tree trunk and feed wheels 1.1-1.3 intended to make contact against the tree trunk while rotating in order to feed the tree through the timber working head 2, together with at least one saw S, which it is appropriate is a saw blade of a chain saw, for cutting the tree trunks T. The frame 3 has a U-shaped cross-section 5 and is furthermore provided with a mounting arrangement 6, a fastening, for suspension at a crane arm or a rotator R, or at a crane arm and a rotator, not shown in the drawings. The feed wheels 1.1-1.3 and the grip fittings 4 are symmetrically placed at the sides of the frame 3. In line with two pairwise arranged feed wheels 1.1, 1.2 at the sides of the frame, at the bottom of the U-shaped cross-section, there is arranged a further support in the form of a roller or a third feed wheel 1.3.

The feed wheel arrangement 1 according to the invention comprises a feed wheel 1.3 and a motor 7 for rotation of the feed wheel 1.3 for feed of the tree or trunk through the timber working head 2, where the motor 7 is arranged at a distance from the feed wheel 1.3. The figures show that this feed wheel 1.3 constitutes the third feed wheel. The invention, however, is not to be limited to this embodiment since the feed wheel of the feed wheel arrangement can be constituted by another feed wheel mounted at a timber working head.

The fact that the motor 7 is arranged at a distance from the feed wheel 1.3 means that the motor 7 is not directly coupled to the feed wheel 1.3, it is not integrated with the feed wheel, that the feed wheel is not located directly on the output shaft 7.1 of the motor. This leads to simpler handling, monitoring and repair of the component parts, and that both the feed wheel arrangement 1 and a timber working head 2 can be given smaller dimensions.

The feed wheel 1.3 that belongs to the feed wheel arrangement 1 is one of three feed wheels symmetrically arranged and mounted at the frame 3, around the tree or tree trunk such that at least two of the three feed wheels are always in contact with the tree or tree trunk.

The feed wheel 1.3 is so located that when the tree trunk is located in the frame 3, with the grip fittings 4 surrounding the tree trunk and with all feed wheels positioned in order to drive the trunk through the frame 3, the tree trunk is in contact with also this third feed wheel. This third feed wheel 1.3 is arranged to rotate around an axis 8 of rotation, and is also driven in order to facilitate transport of the tree trunk through the frame, and as a consequence of the placing, at least two of three feed wheels are always in contact with the tree trunk.

The centrally located third feed wheel is driven to rotate with the aid of a power transfer arrangement 9 from a motor 7. The motor 7 is located at a distance from the feed wheel 1.3 and may be a separate motor for this feed wheel, or it may constitute, in a second embodiment, the drive motor for one or both of the side rollers. The advantage of placing the motor at a distance from the feed wheel is that the frame can be given a smaller outer dimension, and, in addition, a separate motor makes it possible to more easily exchange parts, such as the feed wheel, drive motor or power transfer arrangement, in the event of failure.

The feed wheel arrangement 1 according to the invention comprises a power transfer arrangement 9 that acts between the motor 7 and the feed wheel 1.3 for the transfer of rotational force from an output rotating shaft 7.1 of the motor to the axis 8 of rotation on which the feed wheel 1.3 is mounted either fixed or in a manner that allows it to be removed. The power transfer arrangement 9 of the feed wheel arrangement 1 comprises at least one chain 10, at least one belt 11, or at least one cogged wheel 11c.

Figure 2:
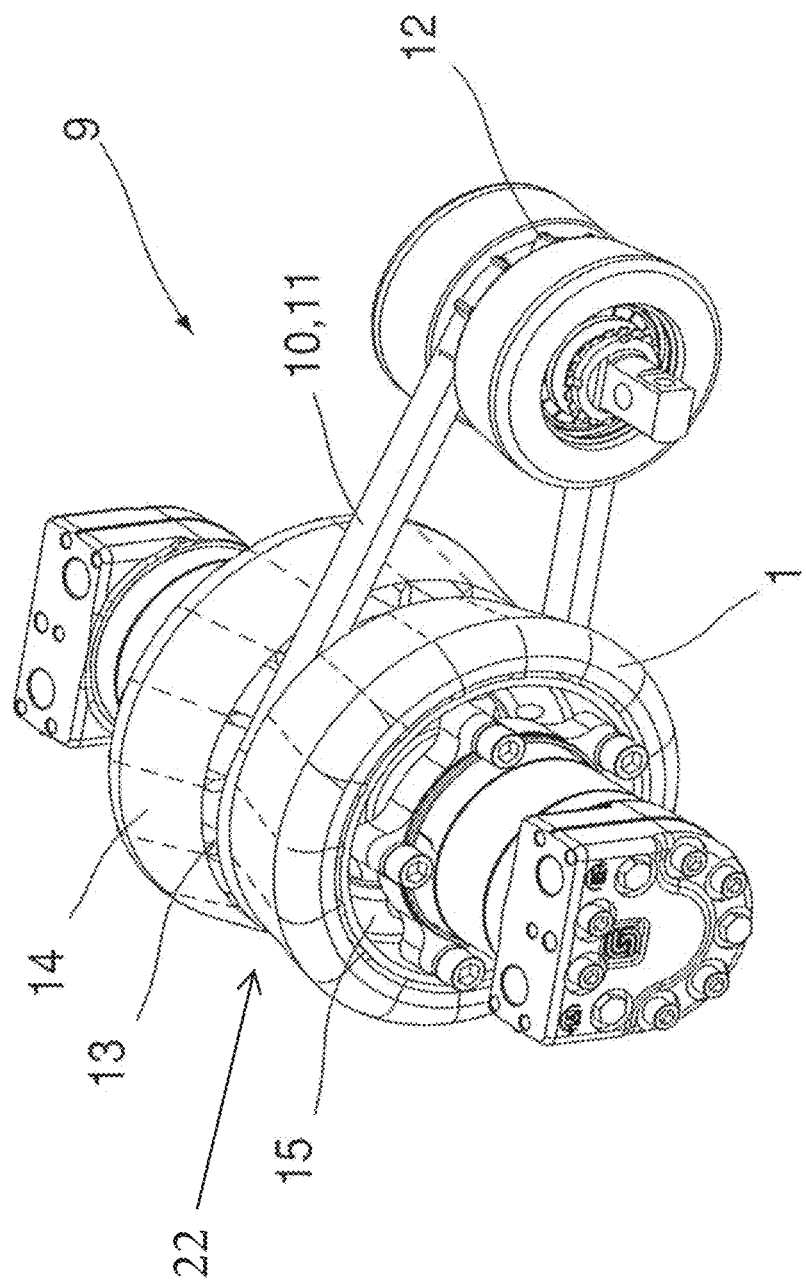
FIG. 2 shows a feed wheel with a drive motor and a power transfer arrangement.

The power transfer arrangement 9 comprises in this preferred embodiment a chain drive that is shown in FIG. 2. The chain 10 runs over a cogged wheel 12 at the drive motor 7 to a cogged wheel 13 arranged at the feed wheel 1.3. It is an advantage if the cogged wheel 13 of the feed wheel is lowered centrally (e.g., in depression 22) in the jacket 14 of the feed wheel 1.3, but it may also be located at the gable end 15 of the feed wheel 1.3 or at the axis 8 of rotation of the feed wheel. The chain 10 may run in the free space between the motor 7 and the feed wheel 1.3, or it may be housed inside a chain protector (not shown in the drawings). The chain protector may be designed as a channel in which the chain runs, which provides protected surroundings and the possibility of efficient lubrication. It should be realised that the chain protector may be designed also only as an angle that extends along one stretch of the chain, and it is suggested that this is the stretch that is located closest to the region in which the tree trunk is located in the frame.

The power transfer arrangement 9 may, in another embodiment, comprise a belt drive. The chain in this case has been exchanged for a belt 11, and the cogged wheels in the motor and the feed wheel have been exchanged for pulleys in known manner.

Figure 3:
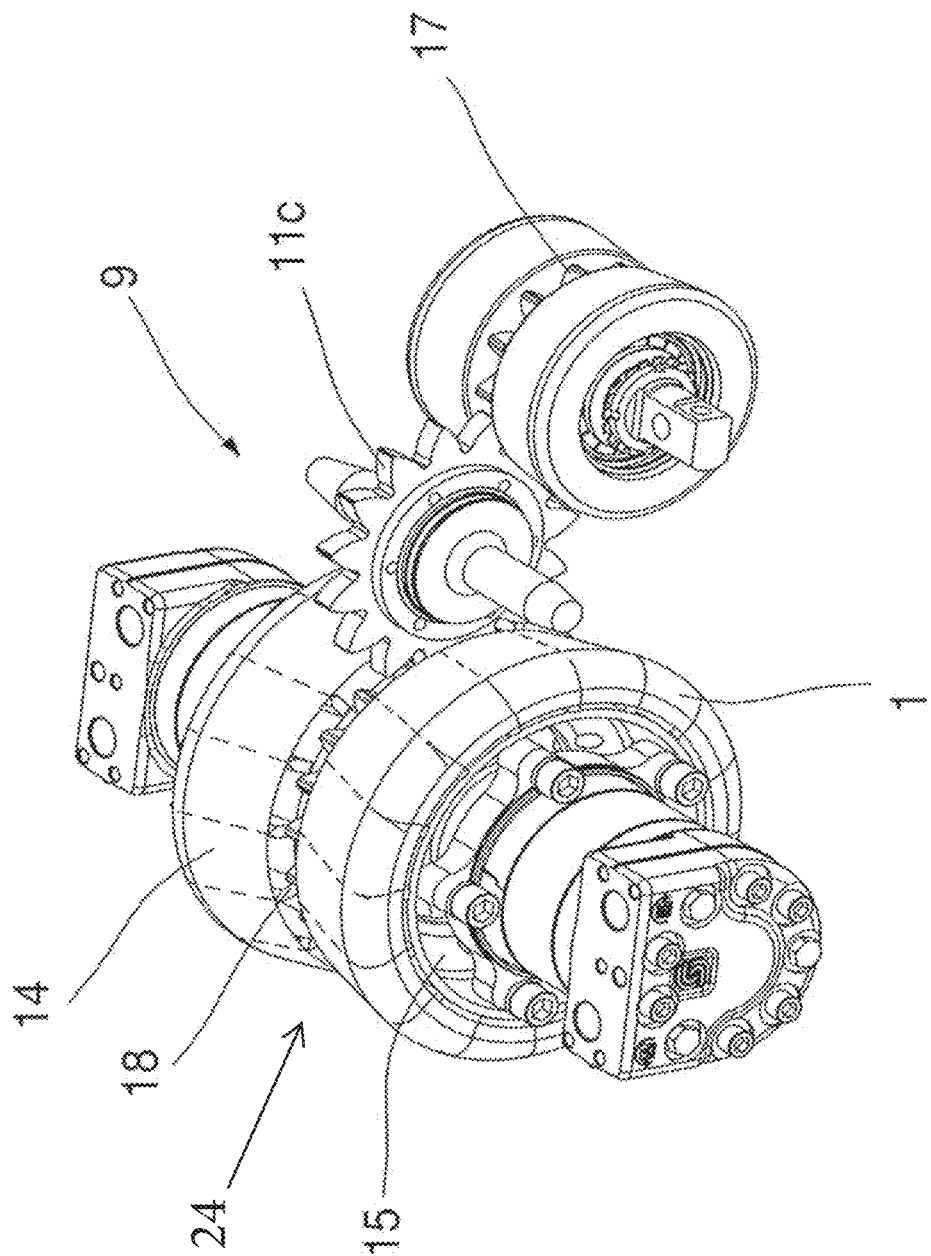
FIG. 3 shows a feed wheel with an alternative power transfer arrangement.

In a further embodiment, which is shown in FIG. 3, the power transfer arrangement comprises a cogged wheel 16. The cogged wheel 16 is in interaction with a cogged wheel 17 at the motor and a cogged wheel 18 that is centrally located (e.g., in depression 24) at the feed wheel 1.3. This type of power transfer arrangement provides direct transfer of power from the motor 7 to the feed wheel 1.3, but the diameter of the power transfer cogged wheel 16 determines the distance between the feed wheel 1.3 and the motor 7. It should be realised that more than one power transfer cogged wheel can be used, for example two or three smaller cogged wheels. This gives the advantage that the motor can be placed further from the feed wheel than is the case when only one power transfer cogged wheel is used, but the risk that extraneous material and twigs fall in between the cogs and disturb the operation increases.

It is an advantage if the drive motor 7 is of the hydraulic motor type, which is coupled with the rest of the hydraulic system. The speed of rotation of the motor, and thus also the speed of rotation of the feed wheel, may then be synchronised with the speeds of the other feed wheels. The advantage of this is that the power system that is required is already available, and this makes use easier. The motor may be also electrically driven, through the feed of power from a power supply at the timber working machine.

In a further embodiment, the drive motor is arranged for direct operation of a fourth feed wheel 1.4. This fourth feed wheel 1.4 is designed to use the power transfer arrangement described above for driving the third feed wheel 1.3. For the direct operation of the fourth feed wheel 1.4, the motor 7 may be integrated into the feed wheel 1.4 or it may be arranged with a direct coupling between the drive shaft 7.1 of the motor 7 and the axis of rotation of the feed wheel 1.4.

The invention concerns also a timber working head 2 that is provided with a feed wheel arrangement 1 described above, since this is the actual working area for the feed wheel arrangement. It is appropriate that such a timber working head 2 comprise a mounting means 6 that makes it possible to attach the timber working head 2 either fixed or in a manner that allows it to be removed to an arrangement that makes it possible to displace and place the timber working head in its working position. The timber working head 2 and its mounting means 6 can be attached to a crane or similar arrangement at a timber working machine, or in another way placed at a timber working machine.

The invention concerns also a crane 19 that comprises such a timber working head 2 that comprises this type of feed wheel arrangement 1. The term "crane" is here used to denote all types of arrangement that make it possible to displace and place the timber working head 2 in its working position, to place a timber working head 2 according to the invention at a predetermined tree or tree trunk.

The invention concerns also a timber working machine 20 comprising a timber working head 2 that comprises this type of feed wheel arrangement 1, or a timber working machine comprising a crane comprising such a timber working head 2 that in turn comprises this type of feed wheel arrangement 1. The term "timber working machine" is here used to denote all types of vehicle that are used to displace and place a timber working head 2 or a crane according to the invention in their working positions, at a predetermined working area, at a predetermined tree or tree trunk.

The invention is not limited to what has been described above and shown in the drawings; it can be changed and modified in several different ways within the scope of the innovative concept.

The invention claimed is:

1. A timber working head for at least one of felling, trimming, bark-peeling and cutting of a tree or tree trunk, the timber working head comprising a frame to which three driven feed wheels and grip fittings are mounted either fixedly or in a manner that allows them to be removed, wherein the three driven feed wheels are configured to make contact against the tree or tree trunk while rotating in order to feed the tree or tree trunk through the timber working head, wherein one of the three driven feed wheels is coupled to a feed wheel arrangement comprising:

a motor for rotation of the driven feed wheel coupled to the feed wheel arrangement and a power transfer arrangement that acts between the motor and the driven feed wheel coupled to the feed wheel arrangement for the transfer of a rotational force from an output rotating shaft of the motor to the driven feed wheel coupled to the feed wheel arrangement, wherein the three driven feed wheels are symmetrically arranged and mounted at the frame, around the tree or trunk such that when arranged around the tree or tree trunk at least two of the three driven feed wheels are always in contact with the tree or tree trunk, for the feed of the tree or trunk through the timber working head, and wherein said driven feed wheel coupled to the feed wheel arrangement is centrally located in the timber working head, wherein the driven feed wheel coupled to the feed wheel arrangement comprises a jacket that forms an outer circumferential surface of the driven feed wheel of the feed wheel arrangement and the power transfer arrangement is provided in a central depression in the outer circumferential surface of the jacket; and wherein the motor is arranged at a distance from the driven feed wheel coupled to the feed wheel arrangement, said output rotating shaft of the motor being displaced from and parallel to a rotation axis of the driven feed wheel coupled to the feed wheel arrangement.

2. The timber working head of claim 1, wherein the power transfer arrangement comprises at least one chain.

3. The timber working head of claim 1, wherein the power transfer arrangement comprises at least one belt.

4. The timber working head of claim 1, wherein the power transfer arrangement comprises at least one cogged wheel.

5. The timber working head of claim 1, wherein the motor is a hydraulic motor.

6. The timber working head of claim 1, wherein the motor is an electric motor.

7. The timber working head of claim 1, wherein the motor is integrated into an additional feed wheel.

8. The timber working head of claim 7, wherein the motor and the additional feed wheel are directly coupled.

9. The timber working head of claim 1, further comprising a mounting arrangement configured to attach the timber working head either fixedly or in a manner that allows the timber working head to be removed at an arrangement configured to displace and place the timber working head in its working position.

10. A crane comprising the timber working head of claim 1.

11. A timber working machine comprising the crane of claim 10.

12. A timber working machine comprising the timber working head of claim 1.

* * * * *